No. 677,557. Patented July 2, 1901.
W. T. BENJAMIN.
APPARATUS FOR MARKING BUTTONHOLE FLIES.
(Application filed Oct. 3, 1900.)
(No Model.) 3 Sheets—Sheet I.
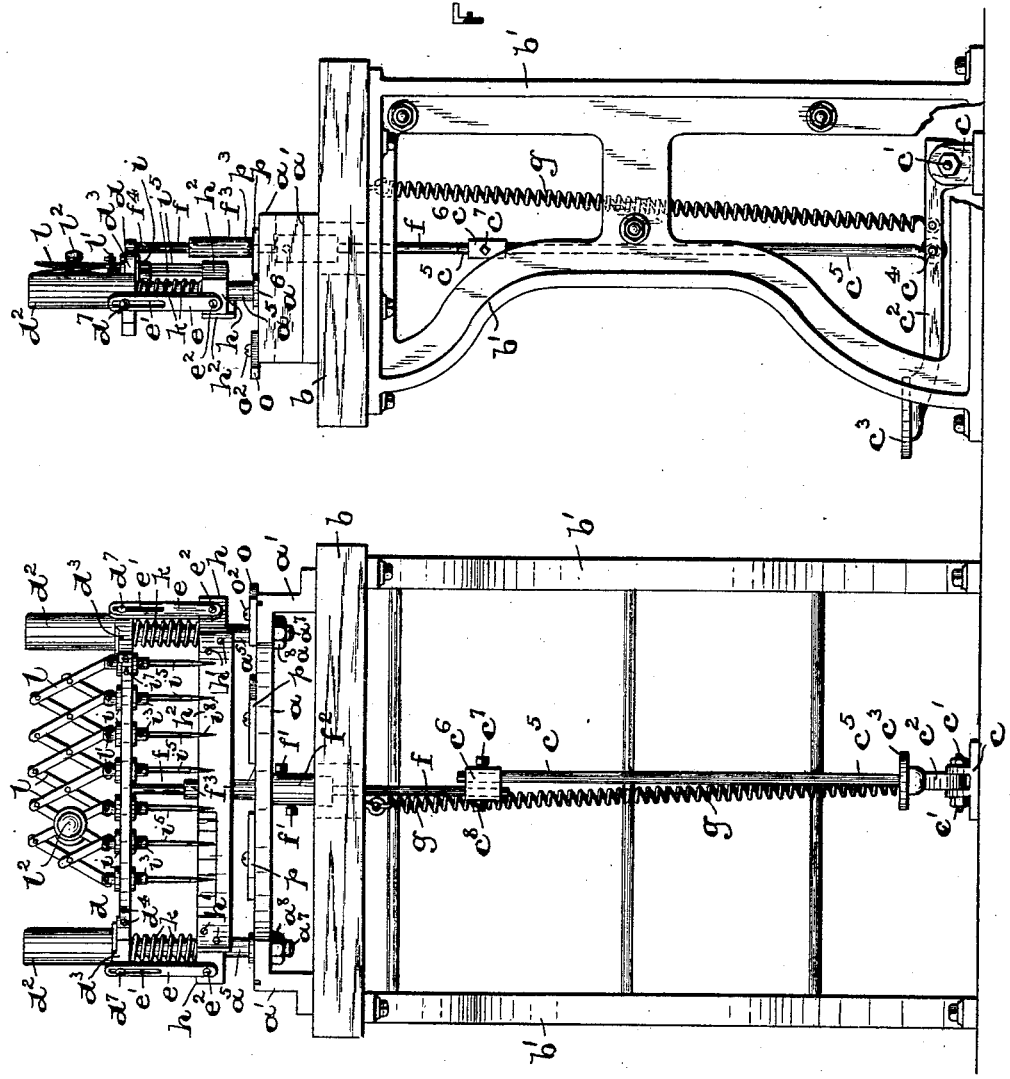
WITNESSES:
INVENTOR:
WILLIAM T. BENJAMIN
BY
Fred'k C. Fraentzel,
ATTORNEY

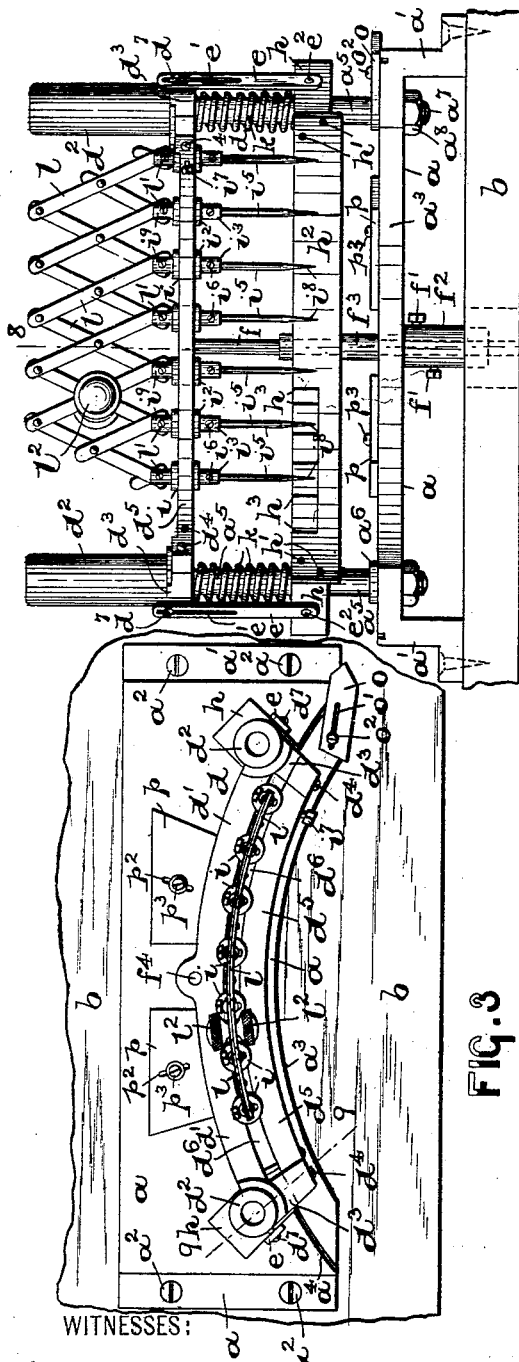
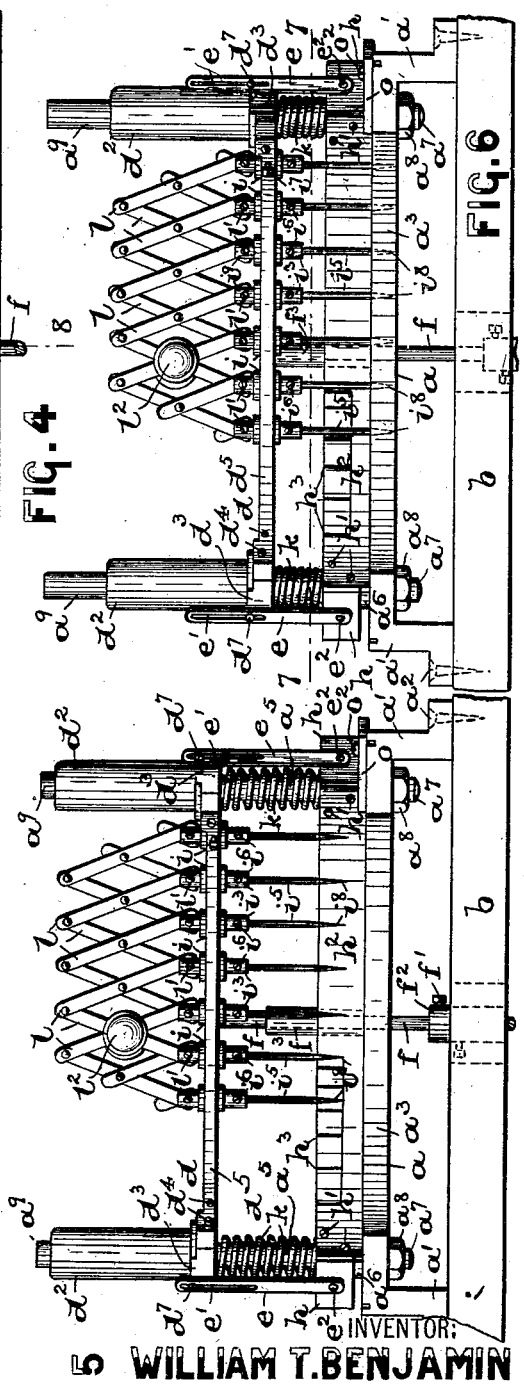

No. 677,557. Patented July 2, 1901.
W. T. BENJAMIN.
APPARATUS FOR MARKING BUTTONHOLE FLIES.
(Application filed Oct. 3, 1900.)
(No Model.) 3 Sheets—Sheet 3.
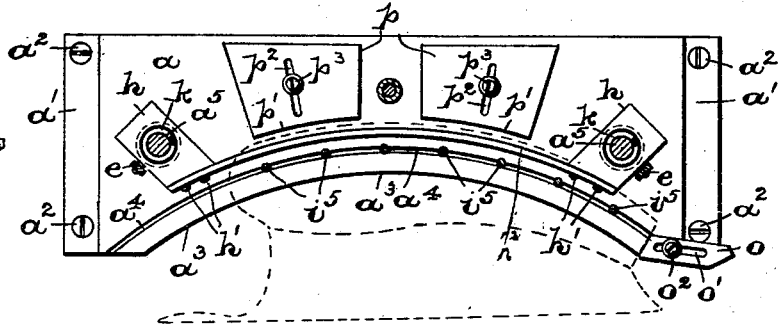
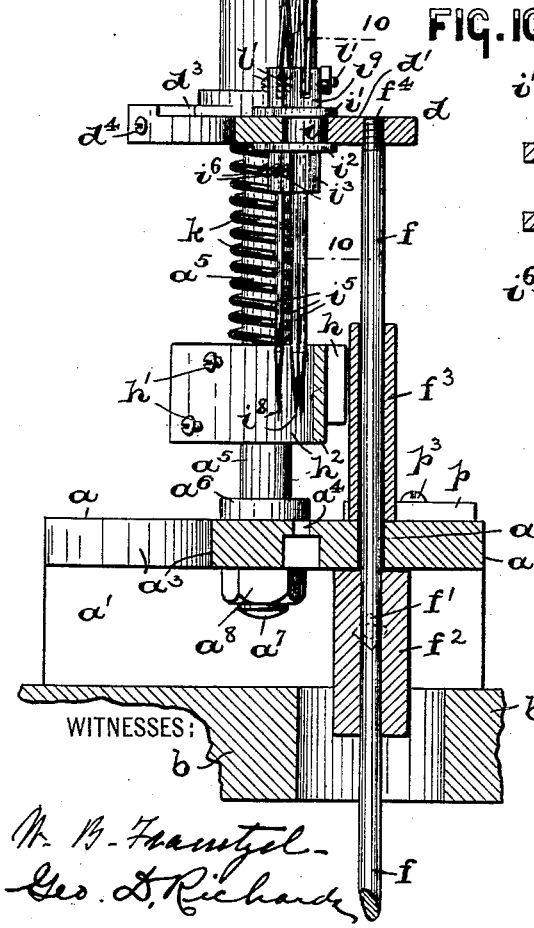
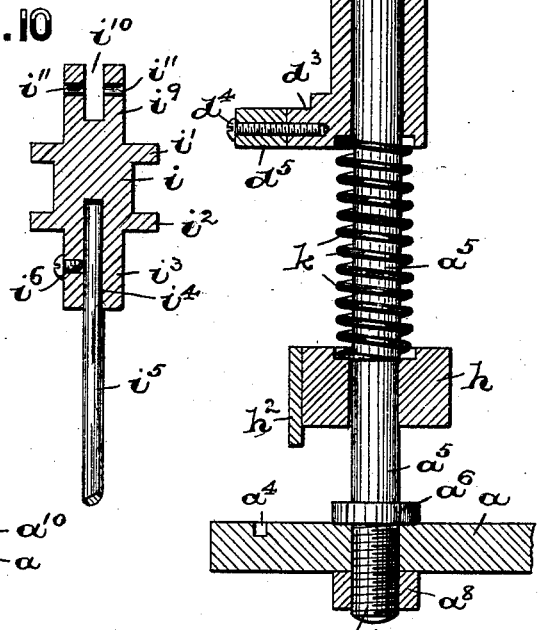
WITNESSES:
INVENTOR:
WILLIAM T. BENJAMIN
BY
Fred C. Fraentzel,
ATTORNEY
THE NORRIS PETERS CO., PHOTO-LITHO., WASHINGTON, D. C.

UNITED STATES PATENT OFFICE.

WILLIAM T. BENJAMIN, OF NEWARK, NEW JERSEY.

APPARATUS FOR MARKING BUTTONHOLE-FLIES.

SPECIFICATION forming part of Letters Patent No. 677,557, dated July 2, 1901.

Application filed October 3, 1900. Serial No. 31,870. (No model.)

*To all whom it may concern:*

Be it known that I, WILLIAM T. BENJAMIN, a citizen of the United States, residing at Newark, in the county of Essex and State of New Jersey, have invented certain new and useful Improvements in Apparatus for Marking or Piercing Buttonhole-Flies; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has reference to a novel construction of machine or apparatus for quickly and easily marking the positions, in the manufacture of shoes, of the buttonholes upon the buttonhole-fly of a shoe to enable the operator to readily place the buttonhole-fly beneath the piercing or cutting tools of the buttonholing-machine, and thereby producing a fly with its buttonholes in the proper positions.

The invention therefore has for its principal object to provide a simple, effective, and cheap machine or apparatus provided with spacers or markers which are adapted to mark off equidistant spaces upon the buttonhole-fly, the spacing or marking mechanism also being so constructed that its parts are easily adjustable and can be readily used to mark off spaces of either greater or less distance apart, as may be desirable, according to the sizes and kinds of shoes; and, furthermore, this invention has for another purpose the production of an effectively-working apparatus or device the essential features of which are the arrangement and combination of a support provided with a piercing or marking base, in connection with which is employed a buttonhole-fly guide, a combined clamping or holding means and stripper, and any suitable number of adjustable markers or piercers arranged to be brought down upon the buttonhole-fly to mark or pierce the places along the proper edge of the fly where the buttonholes are finally to be placed.

The invention therefore consists in the novel apparatus or machine to be employed in connection with a buttonhole-fly in the manner to be hereinafter more fully set forth for the purposes of more quickly and more economically marking upon the fly the positions where the operator is finally to place the buttonholes; and the invention, furthermore, consists in the several novel arrangements and combinations of the various parts, as well as in the details of the construction of the marking or spacing device, all of which will be finally described more in detail in the accompanying specification and then embodied in the clauses of the claim which forms a part of this specification.

The invention is clearly illustrated in the accompanying drawings, in which—

Figure 1 is a front elevation of a machine or apparatus embodying the principles of my present invention, and Fig. 2 is a side view of the same. Fig. 3 is a plan or top view of the spacing or piercing mechanism on an enlarged scale. Fig. 4 is a front view of the said spacing or piercing mechanism, the several parts of the mechanism being represented in their initial positions before the machine is operated. Fig. 5 is a similar view of the said spacing or piercing mechanism, with the combined holding and stripping means in its downwardly-forced position upon the piercing or marking base upon which the buttonhole-fly to be marked or pierced is to be placed; and Fig. 6 is a similar view of the several parts represented in said Figs. 4 and 5, but illustrating, in addition to the downwardly-forced position of the combined holding and stripping means, the downwardly-forced positions of a number of marking or piercing tools or rods, the said views represented in Figs. 5 and 6 also showing the marking or piercing tools in differently-adjusted positions from the positions of the said parts represented in Fig. 4. Fig. 7 is a horizontal section taken on line 7 7 in said Fig. 6, the said view representing in plan the piercing or marking base and one arrangement of guide or guides against which the edges of the buttonhole-flies are to be arranged, so that the same may be properly placed beneath the pointed ends of the marking or piercing tools. Fig. 8 is a vertical section, on an enlarged scale, of the mechanism, the said section being taken on line 8 8 in Fig. 4. Fig. 9 is a similar section taken on line 9 9 in Fig. 3; and Fig. 10 is a detail section of one of the socketed slides for holding and securing in position the piercing or marking tools or rods, the said section being taken on line 10 10 in Fig. 8.

Similar letters of reference are employed in all of the said above-described views to indicate corresponding parts.

The machine or apparatus for marking or piercing the positions for buttonholes on a buttonhole-fly of a shoe consists, essentially, of a suitable base or bed-plate $a$, which is termed the "marking" or "piercing" base and which is provided with suitable leg portions, as $a'$, in which there are holes or perforations for the reception of bolts or screws $a^2$, by means of which the marking or piercing device can be secured upon a suitable table or bench, as will be clearly evident. In the present instance the said marking or piercing base $a$ is secured upon the table $b$, which is provided with suitably-constructed standards or legs $b'$, as clearly illustrated in Figs. 1 and 2 of the drawings. The said base $a$, as will be seen from an inspection of the several figures of the drawings, is preferably formed with the concavo-curved portion $a^3$ at the front and also has a similarly-curved slot $a^4$, substantially as shown and for the purposes hereinafter more fully set forth. Extending upwardly from the upper surface of the said marking or piercing base $a$, at or near the respective ends of the said base, are posts or uprights $a^5$. Each upright has a shoulder or flange $a^6$ and a screw-threaded portion $a^7$, arranged in a screw-threaded hole in the base $a$, and the post or upright is secured or held in its fixed position on said base by means of a nut $a^8$ on the screw end of the post or upright and its shoulder $a^6$, as will be clearly evident from an inspection of Figs. 8 and 9; but of course it will be understood that the said posts or uprights $a^5$ may be secured in their fixed positions upon the said base $a$ in any other desired and suitable manner. As will be seen from Figs. 1 and 2, I have pivotally secured upon a pin or bolt $c'$, in a bearing $c$, the rear end of a treadle or lever $c^2$, which is preferably provided with a footpiece $c^3$. A spring $g$ is employed for causing an upward motion of the said treadle or lever $c^2$ when the pressure is removed from its footpiece $c^3$, the said spring $g$ being connected to the treadle or lever $c^2$ and to a portion of the table or bench $b$, substantially in the manner represented in said Figs. 1 and 2. Pivotally attached to the said treadle or lever $c^2$ by means of a pin or bolt $c^4$ or in any other suitable manner is the lower end of a connecting-rod $c^5$, the said rod being provided at or near its upper end with a sleeve $c^6$, which is adjustably secured in position on said rod $c^5$ by means of a set-screw $c^7$ or by any other suitable means of adjustment. The said sleeve $c^6$ also has secured thereto and preferably adjustably secured thereto by means of a set-screw $c^8$ or in any other suitable manner the lower end portion of a rod or link $f$, the upper portion of which is arranged in and extends through a hole $a^{10}$, forming a bearing in the base $a$, so as to be capable of a reciprocatory movement in said hole when said rod is actuated by means of the connecting-rod $c^5$ from the treadle or lever $c^2$ and the spring $g$. To limit the upward movement of the said rod or link $f$ and the parts connected therewith when caused to move upward by the action of said spring $g$ as soon as the foot-lever $c^2$ has been released by the operator, I have secured thereto by means of set-screws $f'$ or in any other manner a sleeve or collar $f^2$, which acts as a stop when its upper edge is brought against the under surface of the marking or piercing base $a$, as clearly illustrated in Fig. 8. The upper and free end of the said rod or link $f$ is preferably provided with a screw-thread $f^4$ for attaching said end of the rod or link in a screw-threaded hole of a movable plate or yoke $d$ for the purpose to be presently described. Of course it will be understood that said end $f^4$ of the rod or link $f$ may otherwise be attached or secured to the said movable plate or yoke $d$. Upon the said rod or link $f$ is also movably and loosely arranged, so as to rest directly upon the upper surface of the marking or piercing base $a$, a piece of piping or a sleeve $f^3$, substantially as illustrated in Fig. 8. This sleeve $f^3$ acts as a stop and limits the downward movement of the vertically-movable plate or yoke $d$ and the piercing or marking tools connected therewith when the operator applies pressure to the foot lever or treadle $c^2$, as will be clearly evident from an inspection of the several figures of the drawings. The said movable plate or yoke $d$ consists, essentially, of a back piece or plate $d'$, which is curved, as shown, and is provided at its two ends with an upwardly-extending and tubular post $d^2$ to enable the said plate to be movably arranged upon the upper portions $a^9$ of the said posts or uprights $a^5$ on the said marking or piercing base $a$. Each tubular post $d^2$ is provided at or near its lower end portion with a forwardly-extending projection $d^3$, and secured to said projections $d^3$ by means of screws $d^4$ or in any other suitable manner are the two end portions of a second curved bar or plate $d^5$, which forms a front piece of the said movable plate or yoke $d$. When these two plates or bars $d'$ and $d^5$ have thus been secured together, a curved slot or opening $d^6$ is provided, which is arranged directly above and is in perfect alinement with the slot $a^4$ in the said marking or piercing base $a$, as will be clearly evident from an inspection of Figs. 3 and 8. Each tubular post $d^2$ is also provided at or near its lower end with a pin or screw $d^7$, to which is attached, or rather is suspended therefrom, a link $e$, having an elongated slotted portion $e'$, arranged over the pin $d^7$, as shown. The lower end of each link $e$ is secured, by means of a screw or pin $e^2$, to a block or guide $h$, one on each upright or post $a^5$, on which they are movably arranged, and secured to each block or guide by means of the screws $h'$ or in any other suitable manner are the ends of a curved plate $h^2$, which forms the combined clamping and stripping means of the apparatus for securely holding the buttonhole-fly of the shoe which is to be marked or pierced in position directly upon the marking or piercing base $a$ before the downward movement of the marking or piercing mechanism, which is to be described in detail hereinafter. Arranged and encircling the said posts or uprights $a^5$ between the upper surfaces of the said blocks or guides $h$ and the lower surfaces of the tubular posts $d^2$ of the yoke $d$ are the spirally-coiled springs $k$, substantially as shown in the several figures of the drawings and for the purposes to be hereinafter more fully described.

The piercing or marking mechanism consists, essentially, of any desirable number of slides $i$, which are loosely and slidably arranged in the curved slot or opening $d^6$ by means of a pair of annular shoulders or projections $i'$ and $i^2$ on each slide $i$. In the present construction of marking or piercing mechanism seven of such slides are employed; but it will be clearly evident that more or less of such slides may be employed, according to the number of buttonholes desired in the buttonhole-fly of the shoe, the first slide to the right of the yoke $d$ being secured in a fixed position by means of a screw $i^7$, as illustrated. Each slide $i$ is also provided with a downwardly-extending portion $i^3$, in which is a receiving-socket $i^4$ for the reception of the upper end portion of a marking or piercing tool, as $i^5$, each tool $i^5$ being preferably provided with the pointed ends $i^8$ at their lower ends, and each tool $i^5$ being removably secured in the socket of the portion $i^3$ by means of the set-screws $i^6$. It will therefore be evident that I can readily remove one or more of the said tools $i^5$, as may be necessary, according to the number of markings to be made upon or in the buttonhole-fly of the shoe. The upper portion of each slide $i$, as will be seen from the several figures of the drawings, is provided with a pair of ears or lugs $i^9$, forming a space $i^{10}$ between the same, and each ear or lug $i^9$ is provided with a hole or perforation $i^{11}$, as shown in Fig. 10. Pivotally and operatively secured upon pins or pivots $l'$, arranged in the said perforations of each lug or ear $i^9$ of the respective slides $i$, are the lower ends of a system of levers $l$, commonly known as "lazy-tongs," which are pivotally connected with each other, as shown, and are preferably provided at or near the one end of the lazy-tongs with suitable finger-pieces, as $l^2$, for sliding the lazy-tongs laterally across the face of the movable plate or yoke $d$ and setting the pointed end portions $i^8$ of the marking or piercing tools $i^5$ the distances apart as desired by the operator or to certain graduations $h^3$ on the combined holding or clamping and stripper plate $h^2$. After the lazy-tongs have been set by sliding them in a lateral direction all that is necessary is to place the buttonhole-fly of the shoe upon the upper surface of the marking or piercing table or base $a$, bringing the edge of the fly against a certain gage or guide $o$ at one end of the base and against the curved edges $p'$ of other gages or guides $p$ at or near the back of the base $a$, substantially as indicated in dotted outline in Fig. 7. The said guide $o$ may be provided with a slot $o'$ and may be adjustably secured in place by means of the set-screw $o^2$, and the said guides $p$ may be provided with slots $p^2$ and the set-screws $p^3$ for adjustably securing them in place upon the said base $a$. Now when the buttonhole-fly has been placed in position upon the table or base $a$ the operator places his or her foot upon the footpiece of the treadle $c^2$ and presses it down. This operation will cause a downward sliding movement of the blocks or guides $h$ and the plate or yoke $d$ on the uprights or posts $a^5$, the springs $k$ holding these parts in their normally relative positions (indicated in Figs. 4 and 5) until the lower edge of the combined clamping and stripping plate $h^2$ is brought directly upon the buttonhole-fly and clamps the same in its position upon the marking or piercing base $a$, ready to be marked or pierced by the still descending marking or piercing tools $i^5$. When the combined clamping or stripping plate $h^2$ has reached the position indicated in Fig. 5, the treadle or lever $c^2$ has been but partially forced down, and being pressed still farther the said vertically-moving plate or yoke $d$ and the marking or piercing tools connected therewith will now be forced down against the action of the springs $k$, thereby compressing the coils thereof, as indicated in Fig. 6, and the pins $d^7$, connected with the tubular posts $d^2$ of the plate or yoke $d$, will have moved downwardly in the slotted portions $e'$ of the links $e$, all of which is clearly indicated in said Fig. 6. At the same time the sleeve $f^3$ will limit the downward movement of the several parts, and the pointed end portions $i^8$ of the marking or piercing tools $i^5$ will have pierced the buttonhole-fly in the desired places and will have entered the open portion or slot $a^4$ in the marking or piercing table $a$, as indicated in said Fig. 6. When the pressure is taken from the treadle or lever $c^2$ by the operator, then the springs $k$ and the main spring $g$ will cause all the vertically-movable parts of the apparatus to return to their initial and normally inoperative positions, the said plate $h^2$ holding down the buttonhole-fly until the marking or piercing tools $i^5$ have been withdrawn from the fly and the said plate $h^2$ thereby acting as a stripper, as will be clearly evident.

The usefulness and advantages of the hereinabove-described apparatus are evident, for by means of the present construction I have devised a simple and operative machine for the purposes stated, and I have found by practice that the best results can be obtained with a machine or apparatus built on the general principles of the machine herein described and claimed, and illustrated in the accompanying drawings.

Of course I am fully aware that many changes may be made in the several arrangements and combinations of the various parts as well as in the details of the construction of the same without departing from the scope of my present invention. Hence I do not limit my invention to the exact arrangements and combinations of the various parts and the mechanism as herein described and as illustrated in the accompanying drawings, nor do I confine myself to the precise details of the construction of any of the said parts.

Having thus described my invention, what I claim is—

1. The machine for marking buttonhole-flies of shoes herein described, consisting, essentially, of a marking-base and means for securing said base in position, the said base having a curved slot, uprights on said base, a yoke slidably arranged on said uprights, the said yoke having a pair of tubular bearings fitted over said uprights on the marking-base, projections extending from said tubular bearings, a curved bar secured to said projections, forming with the yoke an opening corresponding to and in alinement with the curved slot in the marking-base, a marking mechanism slidably arranged in said opening, and means connected with said yoke for bringing said marking mechanism down upon and marking the positions of the buttonholes in the shoe-fly, substantially as and for the purposes set forth.

2. In a machine for marking buttonhole-flies of shoes, the combination, with a marking-base having a curved slot, and uprights on said base, of a yoke having tubular bearings slidably arranged on said uprights, projections extending from the sides of said tubular bearings, a curved bar secured to said projections, forming with the yoke an opening corresponding to and in alinement with the curved slot in the marking-base, a series of slides movably arranged in said opening, but one of said slides being secured in a fixed and an immovable position in said opening, said slides having shoulders arranged directly above and below the upper and lower faces of said yoke and the curved bar, a marking-tool extending in a downward direction from each slide, perforated ears connected with each slide and a system of levers pivotally connected with said slides for moving them back and forth in the opening formed by the yoke and the curved bar, substantially as and for the purposes set forth.

3. The machine for marking buttonhole-flies of shoes herein described, consisting, essentially, of a marking-base $a$ provided with lugs $a'$ and means for securing said base in position, the said base having a curved slot, uprights on said base, a yoke slidably arranged on said uprights, the said yoke having a pair of tubular bearings fitted over said uprights on the marking-base, projections extending from said tubular bearings, a curved bar secured to said projections, forming with the yoke an opening corresponding to and in alinement with the curved slot in the marking-base, a marking mechanism slidably arranged in said opening, and a combined holding and stripping means arranged on said uprights, directly beneath said vertically-sliding yoke, and a spring on each upright between said combined holding and stripping means and said yoke, said stripping means being connected with said yoke by means of links $e$, secured at their lower ends to said stripping means by screws $e^2$ and being provided with slots $e'$ into which extend screws $d^7$ for slidably attaching said slotted ends of the links to said yoke, and means constructed and arranged for first bringing said combined holding and stripping means down upon the buttonhole-fly and then bringing the marking mechanism down and marking the positions of the buttonholes, substantially as and for the purposes set forth.

4. In a machine for marking the buttonhole-flies of shoes, the combination, with a base having a curved slot, of uprights on said base, a vertically-movable yoke having tubular bearings fitted over and sliding on said uprights, projections extending from said tubular bearings, a curved bar secured to said projections, forming with the yoke a curved slot, slides in said slot, a marking-tool connected with each slide, and a system of lazy-tongs pivotally connected with said slides, for lateral adjustment of the said slides and the marking-tools connected with said slides, and a combined holding and stripping plate, also movably arranged on said uprights, said stripping-plate being connected with said yoke by means of links $e$ secured at their lower ends to said stripping-plate by means of screws $e^2$ and provided with slots $e'$ into which extend screws $d^7$ for slidably attaching said slotted ends of the links to said yoke, substantially as and for the purposes set forth.

In testimony that I claim the invention set forth above I have hereunto set my hand this 1st day of October, 1900.

WILLIAM T. BENJAMIN.

Witnesses:
FREDK. C. FRAENTZEL,
GEO. D. RICHARDS.